United States Patent [19]

Bennett et al.

[11] 3,770,915

[45] Nov. 6, 1973

[54] JOY STICK DIGITAL DIRECTION AND RATE CONTROL UNIT

[75] Inventors: Walter V. Bennett, Granada Hills; Norman J. Bose, N. Hollywood, both of Calif.

[73] Assignee: The Singer Company, Rockefeller Plaza, New York, N.Y.

[22] Filed: Aug. 14, 1972

[21] Appl. No.: 280,681

[52] U.S. Cl. .......................... 200/6 A, 74/471 XY

[51] Int. Cl. .......................... H01h 19/58

[58] Field of Search .......................... 200/6 A; 74/471 XY

[56] References Cited

UNITED STATES PATENTS

| | | | |
|---|---|---|---|
| 3,643,294 | 2/1972 | Wilson | 200/6 A X |
| 3,266,523 | 8/1966 | Stevens | 74/471 XY X |

*Primary Examiner*—J. R. Scott

*Assistant Examiner*—William J. Smith

*Attorney*—Linval B. Castle

[57] ABSTRACT

A joy stick type of manual control unit is provided for digitally positioning objects in the X-Y plane, and which is capable of controlling the direction and rate of the object in that plane by a single control and in one continuous movement. The control unit includes a joy stick type of handle which is mounted in a housing for universal pivotal movement. The joy stick handle is spring loaded to return to its central position when released. A pair of circuit boards is mounted in the housing adjacent one another, and a pair of sliders is sandwiched between the circuit boards for reciprocal rectilinear movement in a particular plane at right angles to one another. The sliders are mechanically coupled to the joy stick to be moved thereby past sets of brushes extending from the circuit boards, so that corresponding digital signals are generated corresponding to each different pivotal position of the joy stick.

9 Claims, 8 Drawing Figures

JOY STICK DIGITAL DIRECTION AND RATE CONTROL UNIT

BACKGROUND OF THE INVENTION

Joy stick manual controlled units are known which produce proportional X and Y analog outputs as the joy stick is moved about its universal pivoted point. However, if digital outputs are required with the prior art control units, a costly analog-digital converter must be included. Unlike the prior art units, the control assembly of the present invention is constructed to produce digital outputs directly. The control unit of the invention is a high-speed, high-precision inter-active unit which combines the X and Y axes into one control for coordinated movement in any direction in the particular plane. The control of the movement is such that all rates of desired motion are easily controlled from the smallest increment to the highest rate of equipment capability.

The unit of the invention, as will be described, is rugged and light in weight. It provides a continuous one-hand direct digital control. The joy stick, as mentioned above, is spring biased to return to its center position of zero output when it is released. As also noted, the generation of digital outputs by the unit of the invention is direct, and no analog-digital conversion is required. The control unit to be described provides direct digital pulses on separate lines for "up" and "down" controls on each axis for corresponding "up-down" counters. The control unit can also be used to produce "pulse" and "direction" outputs to interface with other types of "up-down" counters. The outputs of the unit can be fed directly to counters, and require minimum interface circuitry for application to display or control equipment.

The digital joy stick control assembly of the invention finds particular utility in conjunction with graphic displays, computer peripheral equipment, X-Y plotters, machine tool controls, X-Y table positioning mechanisms, and the like. A common application for the joy stick control, for example, is in the positioning of a dot on a cathode-ray tube display. In the latter application, movement of the joy stick determines the direction and rate of movement of the dot on the cathode-ray display screen.

Two basic pulse generators are contained within the housing of the control unit to be described. One of the pulse generators provides, for example, 240 pulses per second and the other provides 340 pulses per second. From these two basic oscillators, ten discrete frequencies are formed, by use of frequency dividing counters, ranging from 15 pulses per second to 340 pulses per second. These ten frequencies are represented as positions on an X-position commutator, or slider, and on a Y-position commutator, or slider. The joy stick causes the commutators to wipe across the oscillator contacts to select different frequencies as the joy stick is moved. For any given position of the joy stick, an X-axis pulse train of a selected frequency and a Y-axis pulse train of a selected frequency are produced. These pulse trains represent a direction and rate corresponding to a particular angular position of the joy stick.

In the embodiment of the invention to be described, a wiping contact can overlap two adjacent positions on the corresponding commutator. When that happens, two frequences are selected and combined in appropriate logic circuitry to create an additional frequency. In this way, nine additional pulse trains are created to provide a total of 19 discrete possible pulse trains for both the X and Y positions.

In the system described above, a small movement of the joy stick from its center position in the plus or minus X direction, or in the plus or minus Y direction, or any combination thereof, causes the corresponding outputs to change state from logic zero to logic one. This transition may be repeated for incremental jogging at slow rates. Further displacement of the handle causes continuous pulse trains to appear at the selected ±X and ±Y output terminals. The pulse rates approximate a linear function of the angular distance through which the joy stick has been moved. Increased angular movements of the joy stick results in increased pulse rates.

DETAILED DESCRIPTION OF THE ILLUSTRATED EMBODIMENT

Figure 1:
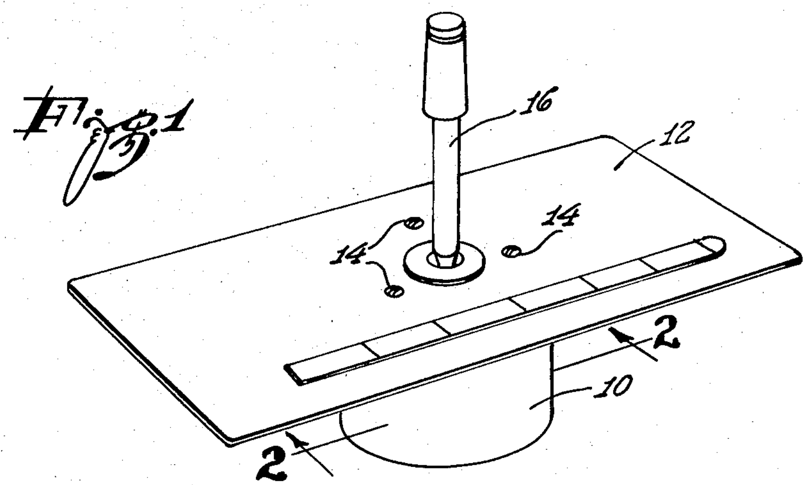
FIG. 1 is a perspective representation of a joy stick control unit constructed to incorporate the concepts of the present invention.
Figure 2:
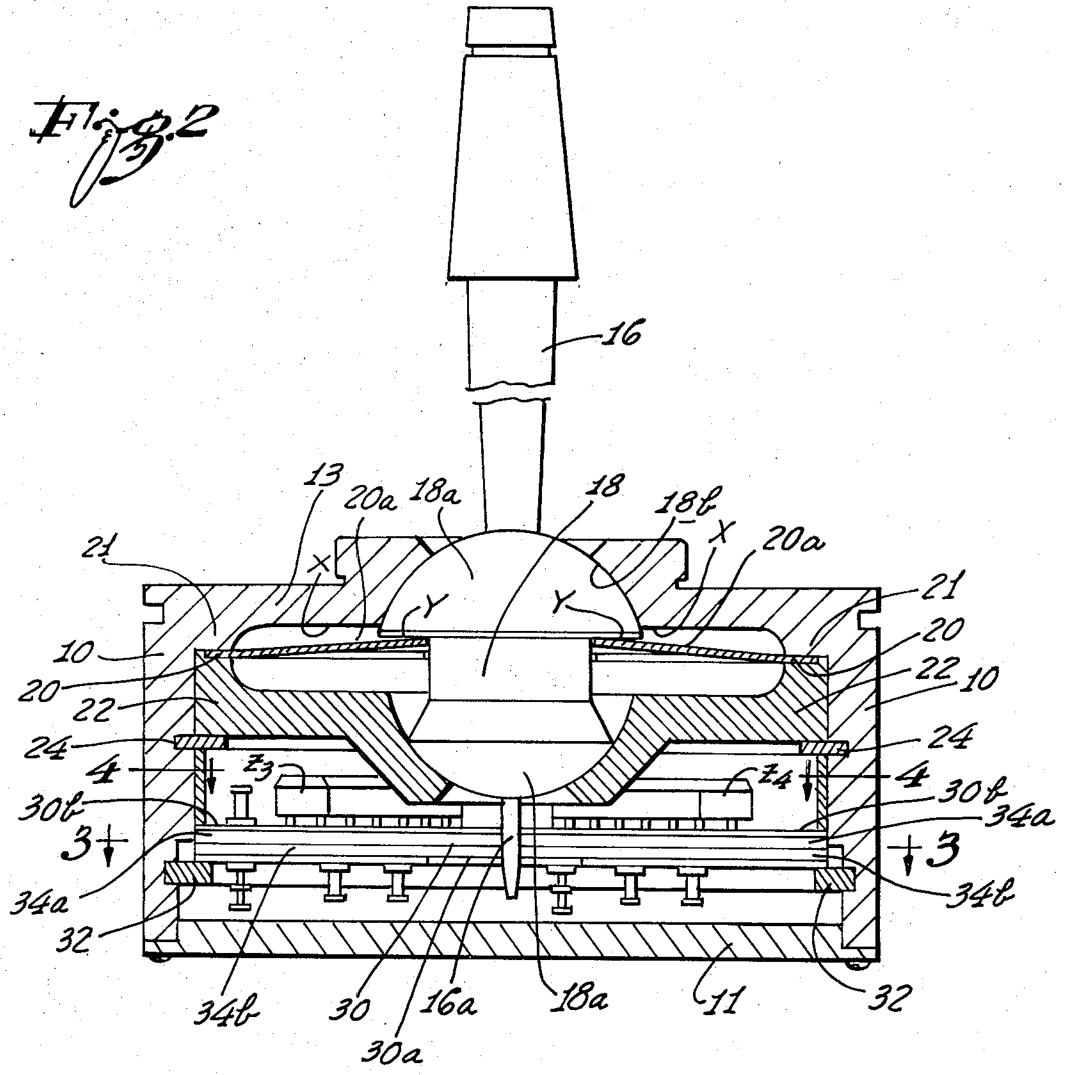
FIG. 2 is a section of the unit of FIG. 1 taken essentially along the line 2—2 of FIG. 1.

As shown in FIG. 1 and 2, the unit of the invention may incorporate a cylindrical housing 10 which is mounted on a support panel 12 by appropriate mounting screws 14. The housing has an end cover 11, and an integral top portion 13. A joy stick handle 16 is pivotally mounted in the housing 10, as best shown in FIG. 2, and it projects upwardly through the panel 12. The joy stick handle 16 is mounted in the housing 10 in a universal ball and socket joint 18, so that the handle 16 may be manipulated as a joy stick to effectuate the desired control.

The universal joint 18 includes a ball **18*a* which is fitted into a socket 18*b* in the top of the housing 10. The ball 18*a* may be formed, for example, of self-lubricating nylon. The ball is provided with a peripheral channel. An annular spring member 20, formed of appropriate resilient material, is supported in the housing, and the spring member includes inwardly extending radial fingers 20*a* which extend into the peripheral channel in the ball, and which bias the ball upwardly in its socket 18*b***.

The annular spring member 20 may be formed, for example, of beryllium copper, or other suitable material. This member accurately centers the joy stick 16 by biasing the upper spherical surface of the ball **18*a* into the mating spherical surface of the socket 18b. The resilient member 20 is supported against a shoulder 21 by a retainer plate 22 which, in turn, is supported within the housing 10 by an appropriate resilient retaining ring 24**.

The resilient spring member 20, in biasing the ball 18a upwardly in its socket 18b serves to position the joy stick 16 firmly in its central position when the joy stick is released. The biasing action of the resilient member 20 also provides a self-sealing action between the ball 18a and the wall of the socket 18b. The surfaces X and Y are adjusted, e.g., by adding shims at X, so that they are co-planar at the zero (center) position of the joy stick. The spring member 20 has radial resilient arms 20a which distributes pressure across the gap between the X and Y surfaces so that a very small movement upsets the balance with nearly full restoring force. The result is a very positive zero position, similar to a detent, but without the inclusion of any detents or added force to achieve the center or zero position. As the joy stick 16 is tilted, it presses down on the resilient arms 20a on one side, and lifts up from the resilient arms 20a on the other, so that there is a very strong increasing force returning the joy stick to its central position.

Figure 3:
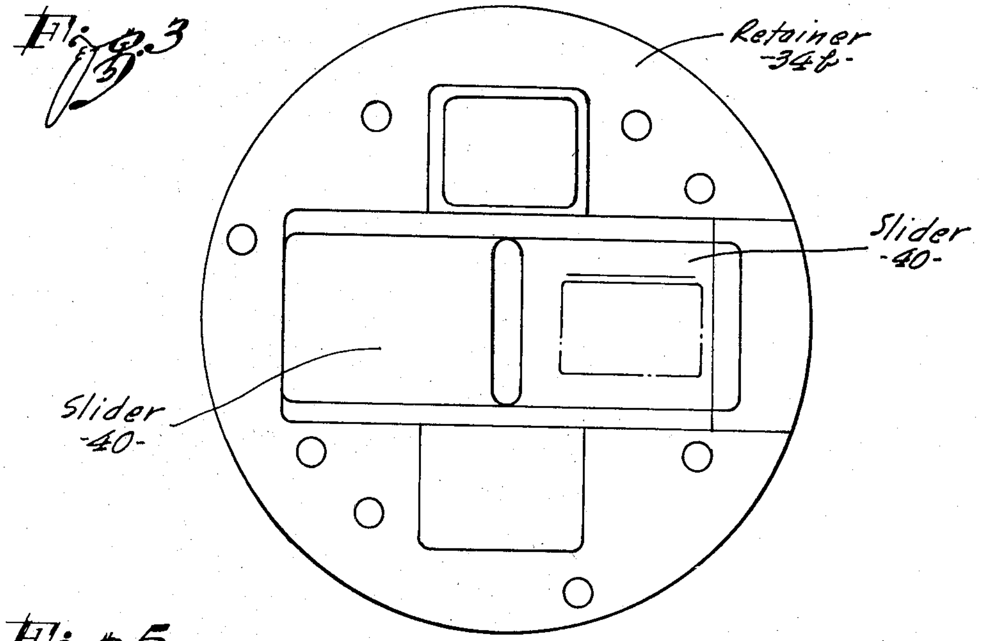
FIG. 3 is a sectional view of certain internal components of the unit of FIG. 2 taken along the line 3—3 of FIG. 2.

A circuit board assembly 30 is mounted within the housing 10 on a ring 32. A pin 16a protrudes from the lower side of the ball 18a, and it extends through the circuit board assembly 30, as shown. The circuit board assembly 30 includes a lower circuit board 30a and an upper circuit board 30b A pair of slide retainers 34a and 34b are sandwiched between the circuit boards 30a and 30b, and these retainers form guideways for a pair of commutators or sliders designated 40 and 42, as best shown in FIGS. 3, 4 and 5.

Figure 4:
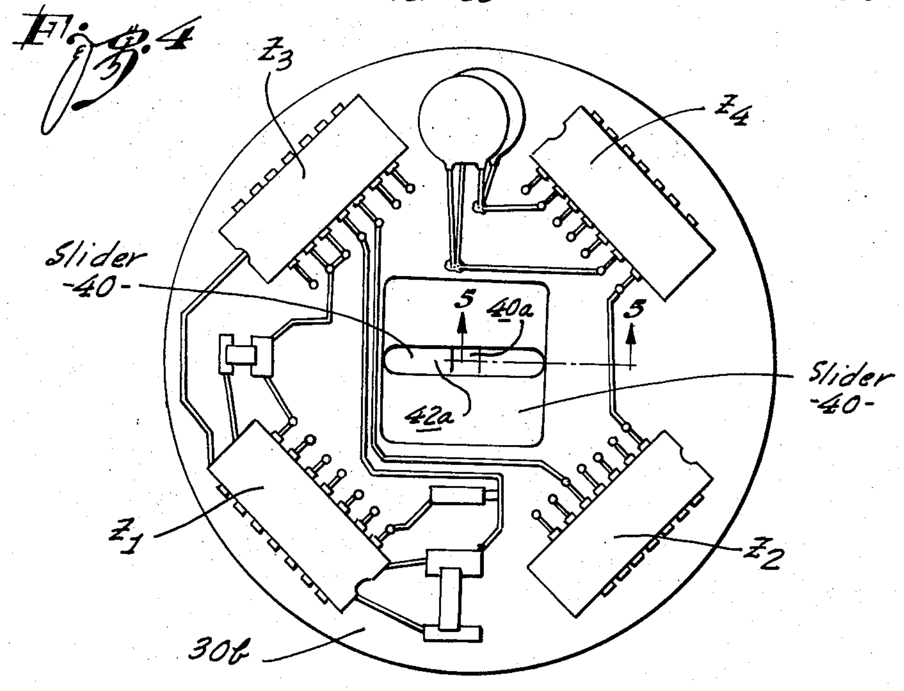
FIG. 4 is another view of the internal components of the unit of FIG. 2 taken along the line 4—4 of FIG. 2.

Each of the sliders 40 and 42 has a transverse slot formed therein, the slots being designated 40a and 42a, The slots extend transversely across the respective sliders, and at right angles to one another, as shown in FIG. 4. The pin 16a extends through the intersecting point of the slots 40a and 42a in a scotch yoke type of coupling. The pin 16a is tapered to prevent binding when the pin protrudes through the slot at an angle, since such angular motion is accompanied by an apparent withdrawal of the pin. The result is that as the joy stick 16 is pivotally moved about its universal joint, the sliders 40 and 42 are caused to slide reciprocally in their corresponding retainers 34a and 34b, at right angles to one another in correspondence with the angular movement of the joy stick.

Figure 5:
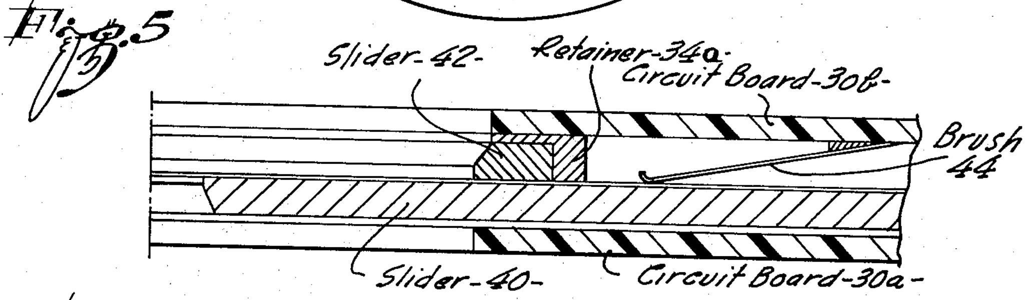
FIG. 5 is an enlarged sectional representation of the internal components of the unit of FIG. 2, taken along the lines 5—5 of FIG. 4.
Figure 6:
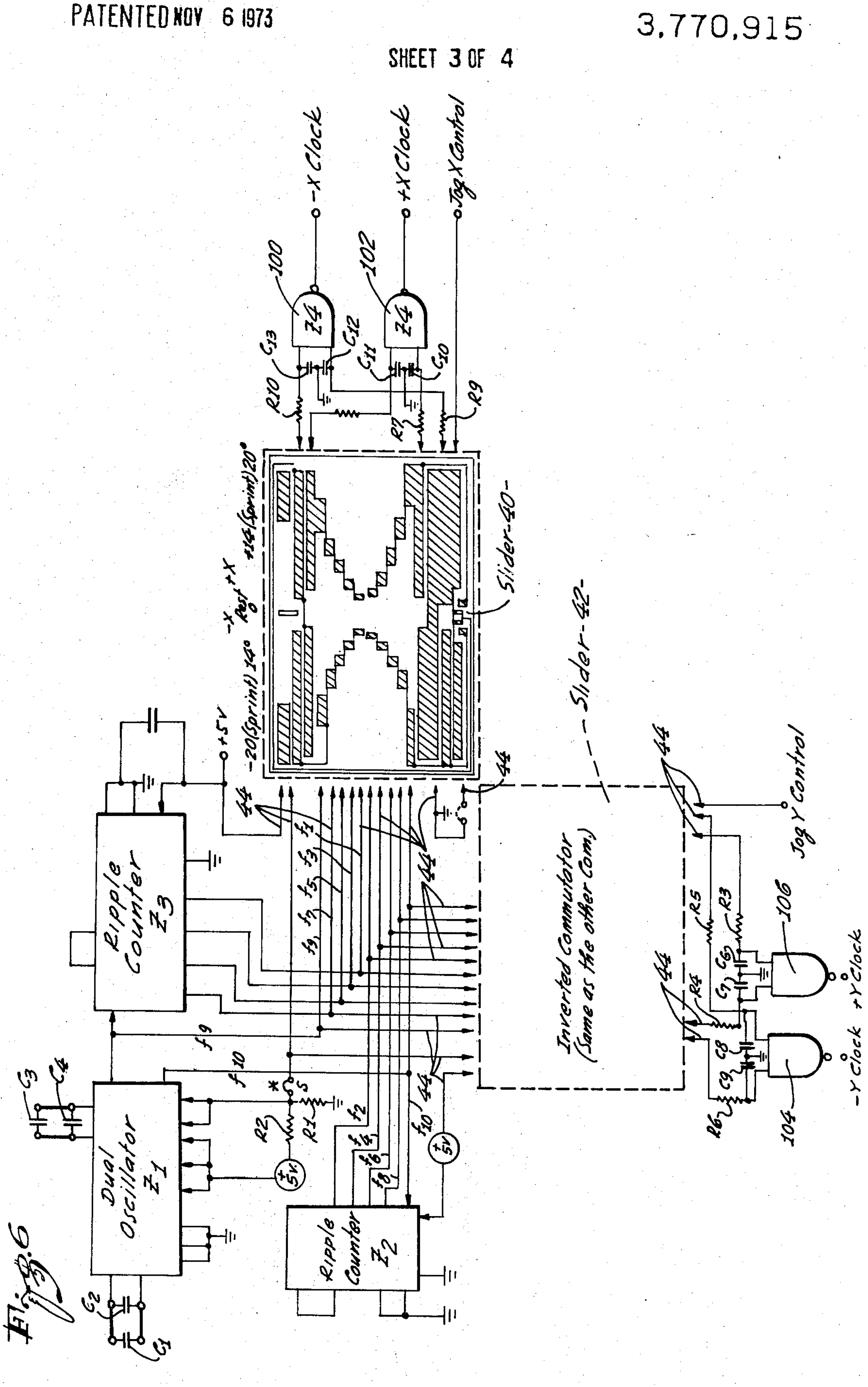
FIG. 6 is a schematic representation of certain commutators, or sliders, included in the unit of FIG. 2, and of certain logic circuitry associated with the commutators.

As the sliders 40 and 42 are moved in the retainers 34a and 34b, a plurality of brushes, such as the brush 44 in FIG. 5, extending from circuits on the two circuit boards 30a and 30b, engage commutator segments on the sliders, as shown schematically in FIG. 6. The sliders 40 and 42 each have commutator segments on them, as shown in FIG. 6, and these commutator segments are engaged by the various brushes 44, as the joy stick moves the sliders reciprocally under the brushes.

A plurality of integrated circuits designated $Z_1$, $Z_2$, $Z_3$ and $Z_4$ are mounted on the upper circuit board 30b. As shown in FIG. 6, the integrated circuit $Z_4$ provides a series of logic gates designated 100, 102, 104 and 106. Certain of the brushes 44 are connected to the gates 100 and 102 through resistors $R_7$, $R_8$, $R_9$ and $R_{10}$, as shown, the inputs to the gates being bridged by capacitors $C_{10}$, $C_{11}$, $C_{12}$ and $C_{13}$. The gate 100 produces the −X clock, the gate 102 produces the +X clock. The lowermost right-hand brush 44 provides a jog X control.

Likewise, corresponding brushes 44 are associated with the slider 42 are connected to the logic gates 104 and 106 through resistors $R_3$, $R_4$, $R_5$ and $R_6$. The input to the latter gates being bridged by capacitors $C_6$, $C_7$, $C_8$ and $C_9$. The gate 104 produces the -Y clock, and the gate 106 produces the +Y clock. An adjacent brush 44 produces the jog Y control. The integrated cirucit $Z_1$ forms a dual voltage controlled oscillator, and the integrated circuits $Z_2$ and $Z_3$ each constitute ripple counters. The integrated circuits are connected as shown, and produce a succession of frequencies $f_1 - f_{10}$ on the corresponding brushes 44.

The resistors and capacitors connected to the gates 100, 102, 104 and 106 form noise filters and are, in effect, RC circuits of a selected time constant which permit the brushes to have momentary discontinuous circuit connections with the commutator segments without adverse affects on the outputs. In the described embodiment the components have been selected to provide an open circuit time constant of at least ten times the normal or closed circuit time constant.

Figure 7:
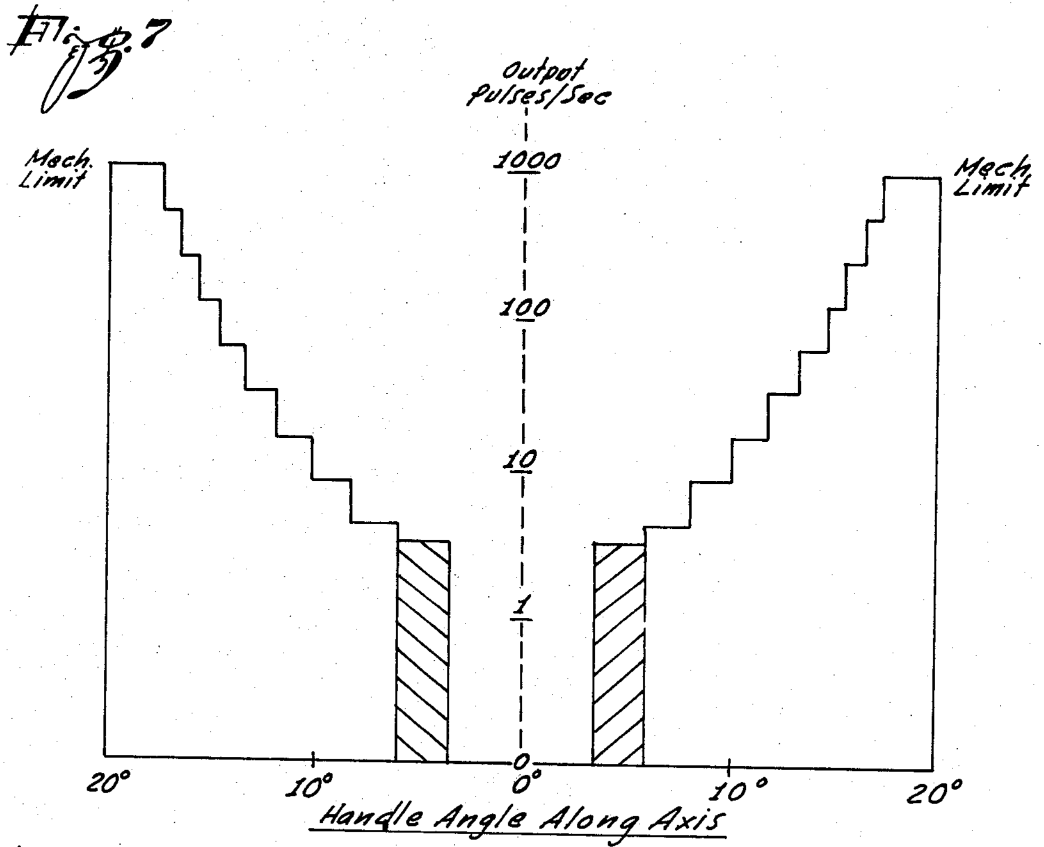
FIG. 7 is a graph useful in explaining the operation of the unit.

As shown by the curves of FIG. 7, when the joy stick 16 is tilted, for example, along the X-axis, in either direction, pulses appear at the outputs of the gate 100 or 102, depending upon the direction in which the handle is tilted. As the tilt angle is increased, the repetition frequency of the pulses produced at the output of the gates 100 and 102 also increases, as shown by the curve. The same curve of FIG. 7 applies to the angle of tilt of the handle 16 along the Y-axis.

Figure 8:
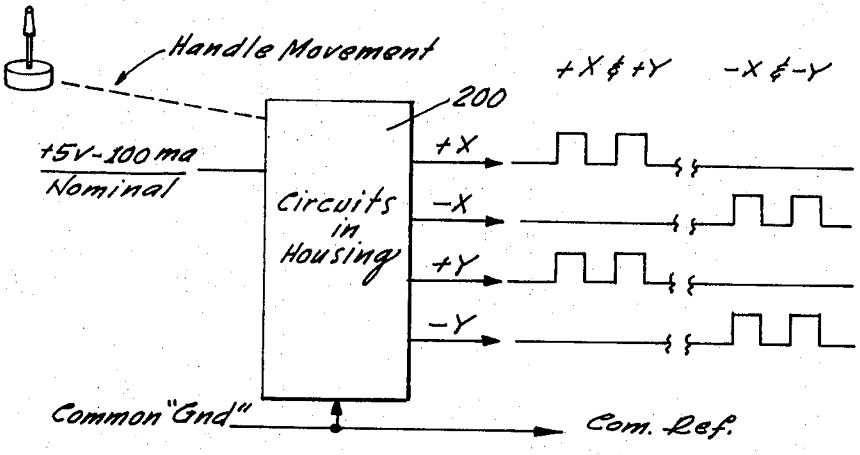
FIG. 8 is a schematic diagram illustrating the output of the unit as the joy stick handle is moved.

The aforesaid action is represented by the schematic representation of FIG. 8, in which the internal circuitry of the unit is represented by the block 200, and as the joy stick 16 is tilted along the X or Y axis, output pulses appear at the +X output, or at the −X output, and at the +Y output or at the −Y output. In each instance, the repetition frequency of the pulses depends upon the angle of tilt of the joy stick. Only one of the X outputs and only one of the Y outputs may be active at any one time.

The circuit and system of FIG. 6 provides, for example, that any angular movement of the joy stick 16 from its central position, in the ±X or ±Y directions, or any combination thereof, produces output clock pulse trains at the respective output terminals, as shown in FIG. 8, and at controlled rates. The controlled pulse trains may be an exponential or linear function of the angular distance of movement of the joy stick. The operator manually controls the pulse rate below four pulses per second. The joy stick movement in a constructed embodiment of the invention is confined to a cone of approximately 20° radius, and it has free and smooth movement in any combination of X and Y directions.

In the constructed embodiment, the continuous pulse trains output range is digital in increments of 1.19, and in 19 discrete rates between 15 pulses per second and 340 pulses per second. Discrete single pulses (zero to approximately 5 pulses per second) are also provided under the manual control of the operator, as represented by the shaded blocks in FIG. 7.

In the system of FIG. 6, the integrated circuit $Z_1$ forms a dual oscillator, the integrated circuit $Z_2$ forms a ripple counter, and the integrated circuit $Z_3$ also forms a ripple counter. The dual oscillator $Z_1$, for example, produces a pulse train of 240 pulses per second for the counter $Z_3$, and a pulse train of 340 pulses per second for the counter $Z_2$.

The counters $Z_2$ and $Z_3$ respond to the pulses from the dual oscillator $Z_1$ to produce ten discrete frequencies in a range from 15 pulses per second to 340 pulses per second, and as designated $f_1 - f_{10}$, in FIG. 6. These ten pulse trains are represented in the system as positions on the X-axis commutator slider 40 and positions on the Y-axis commutator slider 42. As described above, the joy stick 16 moves the commutator contacts across the brushes to select different frequencies. In any non-zero position an X frequency and a Y frequency are selected, and these two frequencies represent the direction and rate desired.

As mentioned above, a pair of wiping contacts can simultaneously contact two adjacent positions on either, or both, the commutator slider 40 or commutator slider 42. When that occurs, two frequencies are selected by the wipers and are combined in the gates 100 or 102, 104 or 106, to create a new overlap frequency, so that nine additional overlap frequencies can be created giving a total of nineteen discrete possible output frequencies at each of the output terminals.

A link designated by (*) at S provides for multiplied rates of the output pulse trains when the joy stick, for example, is in the angular range of 14°–20° in the plus or minus direction. This is achieved by connecting the +5 volt source to the junction of the resistors $R_1$ and $R_2$ for the aforesaid angular positions of the joy stick. The ratio of $R_1$ and $R_2$ is chosen to provide a frequency stabilized for variations in the +5 volt source. Connecting the frequency control point to +5 volts increases the frequency of both oscillators simultaneously, thereby shifting all rates and, therefore, maintaining their ratios.

Likewise, a jog control may be achieved by connecting the link designated (**) at the terminals J. which provide for pulse outputs at the X or Y terminals for each successive movement of the joy stick from its center position.

The invention provides, therefore, an improved joy stick control unit which provides direction digital outputs, and which does not require additional analog-to-digital converters to achieve its results. While a particular embodiment of the invention has been shown and described, modifications may be made. It is intended in the claims to cover the modifications which come within the spirit and scope of the invention.

What is claimed is:

1. A joy stick control unit comprising: a housing; a joy stick; mounting means positioning the joy stick in the housing for universal angular movement of the joy stick; commutator means having electrically conductive and electrically non-conductive segments slidably mounted in the housing and mechanically coupled to the joy stick for rectilinear movement in correspondence with angular movement of the joy stick, said commutator means comprising first and second commutator sliders mounted in said housing for rectilinear movement along paths at right angles to one another; electronic circuit means mounted in the housing including circuitry generating a plurality of pulse trains of different frequencies; brush means connected to said electronic circuitry and positioned in sliding contact with the conductive segments of said commutator means; and output terminal means connected to said electronic circuit means for producing digital output signals in the form of pulses at rates indicative of the relative position of said commutator means and said brush means, said electrically conductive segments of said commutator means selectively engaging said brush means to cause different pulse frequencies selectively to be introduced to said output terminal means.

2. The joy stick control unit defined in claim 1, in which said mounting means comprises a ball and socket joint, and which includes an annular resilient member interposed between said housing and said mounting means, and including radial fingers engaging said ball and biasing said ball upwardly into said socket.

3. The joy stick control unit defined in claim 2, in which said radial fingers extend inwardly from a rim portion of the annular member.

4. The joy stick control unit defined in claim 1, in which said output terminal means includes first and second terminals for respectively producing output pulses at rates representative of the position of the first commutator slider, and third and fourth output terminals producing output pulses at a rate representative of the position of the second commutator slider.

5. The joy stick control unit defined in claim 4, in which said electronic circuit means includes logic circuitry connected to said output terminal means for producing pulses at additional frequencies whenever said brush means overlap two conductive segments of said commutator means.

6. The joy stick control unit defined in claim 5, and which includes resistance-capacitance noise filter means connected in circuit with said last-named logic circuitry.

7. The control unit defined in claim 1, in which said electronic circuit and brush means are formed on circuit boards positioned adjacent each of said commutator sliders.

8. The control unit defined in claim 7, in which each of said commutator sliders is sandwiched between a pair of said circuit boards.

9. The control unit defined in claim 6 in which said filter means has a noise time constant at least ten times greater than the signal time constant.

* * * * *